US 6,706,999 B1
Mar. 16, 2004

(54) LASER BEAM TERTIARY POSITIONER APPARATUS AND METHOD

(75) Inventors: Spencer B. Barrett, Beaverton, OR (US); Mark A. Unrath, Portland, OR (US); Donald R. Cutler, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 10 days.

(21) Appl. No.: 10/373,232

(22) Filed: Feb. 24, 2003

(51) Int. Cl.$^7$ .............................................. B23K 26/06
(52) U.S. Cl. .............................. 219/121.74; 219/121.85
(58) Field of Search ........................ 219/121.74, 121.85, 219/121.73, 121.6

(56) References Cited

U.S. PATENT DOCUMENTS

| | | | |
|---|---|---|---|
| 3,432,671 A | 3/1969 | Edumnds | 250/217 |
| 4,532,402 A | 7/1985 | Overbeck | 219/121.78 |
| 5,074,628 A | 12/1991 | Khattak et al. | 359/205 |
| 5,223,692 A | 6/1993 | Lozier et al. | 219/121.67 |
| 5,280,378 A | 1/1994 | Lombardo | 359/199 |
| 5,382,770 A | 1/1995 | Black et al. | 219/121.63 |
| 5,449,882 A | 9/1995 | Black et al. | 219/121.83 |
| 5,484,982 A | 1/1996 | Nihei et al. | 219/121.79 |
| 5,526,165 A | 6/1996 | Toda et al. | 359/202 |
| 5,536,916 A | 7/1996 | Kohari et al. | 219/121.83 |
| 5,571,430 A | 11/1996 | Kawasaki et al. | 219/121.78 |
| 5,653,900 A | 8/1997 | Clement et al. | 219/121.68 |
| 5,666,202 A * | 9/1997 | Kyrazis | 356/614 |
| 5,751,585 A | 5/1998 | Cutler et al. | 364/474.03 |
| 5,798,927 A | 8/1998 | Cutler et al. | 364/474.3 |
| 5,847,960 A | 12/1998 | Cutler et al. | 364/474.29 |
| 5,940,789 A * | 8/1999 | Yuan | 702/150 |
| 6,144,118 A * | 11/2000 | Cahill et al. | 310/12 |
| 2002/0050571 A1 * | 5/2002 | Watson | 250/491.1 |
| 2003/0173556 A1 * | 9/2003 | Watson | 254/389 |

OTHER PUBLICATIONS

"Fast Steering Mirrors", Newport Corporation. Irvine California Jan. 2004. 4 pages.
"Fast Steering Mirror Technology: Active Beam Stabilization". Phillip V. Mitchell. Newport Corporation. Irvine. California. Jan. 2004, 6 pages.

* cited by examiner

Primary Examiner—M. Alexandra Elve
(74) Attorney, Agent, or Firm—Stoel Rives LLP

(57) ABSTRACT

A tertiary positioner system (80) of this invention employs X- and Y-axis translation stages (86, 88), galvanometer-driven mirrors (64, 66), and a fast steering mirror ("FSM") (120) to direct a laser beam (90) to target locations (121) on a workpiece (92). A positioning signal is received by a low-pass filter (103) that produces filtered position data for driving the X- and Y-axis translation stages. The actual positions of the X- and Y-axis translation stages are subtracted from the unfiltered positioning data to produce an X-Y position error signal for driving the galvanometer-driven X- and Y-axis mirrors. The actual mirror positions are subtracted from the actual positions of the X- and Y-axis translation stages to generate a positional error signal representing the difference between the commanded and actual positions of the laser beam. The positional error signal drives the FSM to rapidly correct any positional errors.

17 Claims, 4 Drawing Sheets

LASER BEAM TERTIARY POSITIONER
APPARATUS AND METHOD

RELATED APPLICATION

Not applicable

1. Technical Field

This invention relates to laser beam processing of electronic circuits and, in particular, to a system and method employing a laser beam and substrate positioning system having coarse, intermediate, and fine positioning stages for positioning a workpiece and a laser beam relative to each other.

2. Background of the Invention

Lasers have long been employed for various ablating, drilling, and micro-machining applications, such as etched-circuit board ("ECB") via drilling, integrated circuit ("IC") fusible link ablating, circuit element trimming, and micro-machining of silicon, piezo-electric, and ceramic circuit elements. In each of these electronic circuit processing applications, a positioner system is employed to position a workpiece and a laser beam relative to each other. For example, ECB via drilling typically requires long positioning moves of moderate precision, whereas IC fusible link ablating requires short positioning moves of high precision. Accordingly, different positioner architectures are typically employed for each application.

Traditional positioning systems are characterized by X-Y translation tables in which the workpiece is secured to an upper stage that moves along a first axis and is supported by a lower stage that moves along a second axis that is perpendicular to the first axis. Such systems typically move the workpiece relative to tool, such as a fixed laser beam position or laser spot and are commonly referred to as stacked stage positioning systems because the lower stage supports the inertial mass of the upper stage which supports the workpiece. Stacked stage positioning systems are, however, relatively slow because the starting, stopping, and change of direction of the inertial mass of the stages increase the time required for the laser tool to process all the target locations on the workpiece.

In split-axis positioning systems, the upper stage is not supported by, and moves independently from the lower stage. The workpiece is carried on a first axis or stage while the tool, such as a reflecting mirror and associated laser beam focusing lens, is carried on the second axis or stage. Split-axis positioning systems are advantageous as the overall size and weight of the workpiece increases, utilizing longer and hence more massive stages. Split axis systems are frequently employed in micro-machining and ECB via drilling applications.

More recently, planar positioning systems have been employed in which the workpiece is carried on a single stage that is movable by two or more actuators while the tool remains in a substantially fixed position. These systems translate the workpiece in two dimensions by coordinating the efforts of the actuators. Some planar positioning systems may also be capable of rotating the workpiece.

FIG. 1 shows a conventional way of providing two-axis deflection of a laser beam by employing a high-speed short-movement positioner ("fast positioner") 60, such as a pair of galvanometer driven mirrors 64 and 66. FIG. 1 is a simplified depiction of a galvanometer-driven X-axis mirror 64 and a galvanometer-driven Y-axis mirror 66 positioned along an optical path 70 between a fixed mirror 72 and focusing optics 78. Each galvanometer-driven mirror deflects the laser beam along a single axis to direct the beam to the target location on a workpiece 79. U.S. Pat. No. 4,532,402 of Overbeck discloses a stacked stage beam positioning system that employs such a fast positioner, and U.S. Pat. Nos. 5,751,585 and 5,847,960 of Cutler et al. disclose split-axis beam positioning systems in which the upper stage(s) carry at least one fast positioner. Systems employing such fast positioners are used for nonlink blowing processes, such as via drilling, because they cannot currently deliver the beam as accurately as "fixed" laser head positioners.

The split-axis nature of such positioners may introduce rotational Abbe errors, and the galvanometers may introduce additional positioning errors. In addition, because there must be separation between the two galvanometer-controlled mirrors, the mirrors cannot both be located near the entrance pupil to the focusing optics. This separation results in an offset of the beam that can degrade the quality of the focused spot. Moreover, two-mirror configurations constrain the entrance pupil to be displaced farther from the focusing optics, resulting in an increased complexity and limited numerical aperture of the focusing optics, therefore limiting the smallest achievable spot size.

What is still needed, therefore, is a system and method for achieving higher electronic circuit processing throughput while maintaining positioning speed, distance, and accuracy along with focused spot quality consistent with the particular processing application.

SUMMARY OF THE INVENTION

An object of the invention is, therefore, to provide a system and method for achieving higher electronic circuit laser processing throughput.

Another object of the invention is to provide a positioner system employing linear, galvanometer, and two-axis steering mirror stages that coact to optimize positioning accuracy, speed, and laser spot size for a variety of electronic workpiece processing applications.

Yet another object of the invention is to provide a positioner system employing coordinated motion for electronic circuit laser-based processing applications.

A preferred embodiment of a tertiary positioner system of this invention employs a combination of processing elements, such as a computer, microprocessor, and digital signal processor (hereafter singly or collectively "DSP") to control a laser beam deflection stage, an X-axis translation stage, and a Y-axis translation stage to direct a laser beam to target locations on a workpiece, such as an IC or ECB. Although the tertiary positioner system is configured with a single laser beam deflection stage mounted on the X-axis translation stage and a single workpiece mounted on the Y-axis translation stage, other configurations of positioning systems, such as ones in which multiple laser beam deflection stages are employed in combination with stacked, split, or planar positioners.

A system control computer processes a tool path database stored in a database storage subsystem. The database contains the desired processing parameters for cutting holes or profiles with the laser beam in the workpiece. The system control computer conveys laser control portions of the stored database to a laser controller and position control portions as a data stream to a profiling process that resolves the data stream into position, velocity, and time components for each intended change in the path of the laser beam across the workpiece.

The laser controller is controlled by timing data generated by the profiling process and further coordinated by a triggering process that synchronizes the firing of a laser to the motion of the laser beam deflection stage and the X- and Y-axis translation stages.

The positioning commands are received by a low-pass filter having a constant signal propagation delay L and by a delay L element that compensates for the propagation delay. The low-pass filter conveys low-pass filtered position command data through an adder to a low-frequency controller, which drives the X and Y-axis translation stages. Delay L element conveys the unfiltered positioning commands from the position profiler to signal processing elements for driving the laser beam deflection stage.

The X- and Y-axis translation stages include position sensors, which convey an actual position of the translation stages to an adder that subtracts the actual position from the low-pass filtered command data to close the control loop and direct the translation stages to the commanded position.

Another adder subtracts the actual position from the delayed positioning commands and produces a low-frequency stage position error signal that is conveyed to a mid-pass filter and a delay M element. Mid-pass filtered position error data is passed through an adder to a mid-frequency controller, which drives galvonometer-deflected mirrors in the laser beam deflection stage. Because midpass filter 109 produces filtered position error data having a constant time delay M, the constant time delay M is compensated for by delay M element, which delays conveying the low-frequency error data to the signal processing elements for driving the laser beam deflection stage.

The galvanometer-deflected mirrors include position sensors, which convey an actual position of the galvanometer mirrors to an adder that subtracts the actual position from the mid-pass filtered error data to close the control loop and direct the galvonometer driven mirrors to the commanded position.

Yet another adder subtracts the actual galvonometer position signal from the delayed error signal produced and produces a high-frequency stage position error signal that is conveyed to a high-frequency controller, which drives a high frequency stage in the laser beam deflection stage.

This invention substantially reduces the effects of low- and mid-frequency stage settling times by adding an FSM within the laser beam deflection stage.

The tertiary positioner system employing the FSM increases electronic circuit processing throughput by decreasing the time required to move the laser beam between target locations and by decreasing the processing time at each location. Adding the FSM as a third positioning stage provides more accurate positioning because positional and settling time errors caused by the first two stages can be corrected by the FSM.

In an alternative embodiment, the FSM may be positioned to receive the laser beam from the galvanometer-driven X- and Y-axis mirrors and deflect it through focusing optics toward the workpiece.

Additional objects and advantages of this invention will be apparent from the following detailed description of preferred embodiments thereof which proceed with reference to the accompanying drawings.

DETAILED DESCRIPTION OF PREFERRED EMBODIMENTS

The beam positioning system preferably employs a laser controller that controls a stacked, split-axis, or planar positioner system and coordinates with steerable reflectors to target and focus a laser beam to a desired target location on an electronic circuit workpiece. The beam positioning system may alternatively or additionally employ any of the improvements, beam positioners, and coordinated motion techniques described in U.S. Pat. Nos. 5,751,585, 5,798,927, and 5,847,960 of Cutler et al., which are assigned to the assignee of this application and incorporated herein by reference. Other fixed head or linear motor driven conventional positioning systems could also be employed as well as the systems employed in the 9800 model series manufactured by ESI of Portland, Oreg., the assignee of this application.

Figure 2:
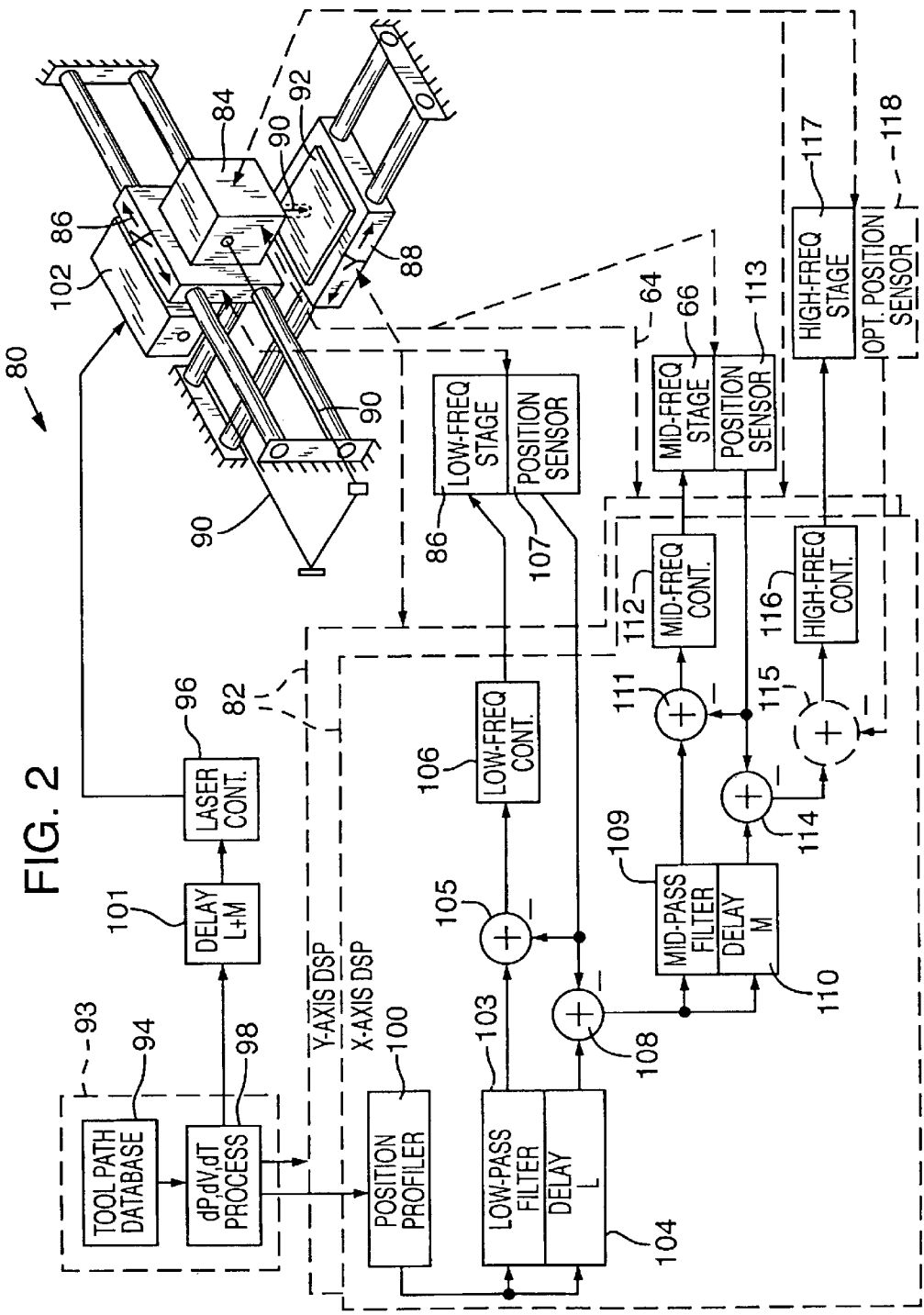
FIG. 2 is a combined pictorial and electrical block diagram of a tertiary laser beam positioning system of this invention.

FIG. 2 shows a split stage embodiment of a tertiary positioner system 80 of this invention, which is described by way of example with reference to a laser-based hole cutting system employing a computer, such as digital signal processor ("DSP") 82 to control a laser beam deflection stage 84, an X-axis translation stage 86, and a Y-axis translation stage 88 to direct a laser beam 90 to target locations on a workpiece 92, such as an IC or preferably an ECB. Although positioner system 80 is configured with a single laser beam deflection stage 84 mounted on X-axis translation stage 86 and a single workpiece 92 mounted on Y-axis translation stage 88, other configurations of positioning systems are possible, such as ones in which multiple stages 84 are employed in combination with stacked, split, or planar positioners. Skilled workers will understand that DSP 82 includes substantially identical X- and Y-axis portions, although only the X-axis portion is shown and described herein.

A system control computer 93 processes a tool path database 94 stored in a database storage subsystem. Tool path database 94 contains the desired processing parameters for cutting holes, profiles, or links with laser beam 90 in workpiece 92. System control computer 93 conveys laser control portions of the stored database to a laser controller 96 and position control portions as a data stream to a profiling process 98. Profiling process 98 resolves the data stream into profiling position dP ("dx" and "dy"), profiling velocity dV ("dvx" and "dvy"), and profiling time dT ("dtx" and "dty") for each intended change in the path of laser beam 90 across workpiece 92. Consequently, each movement of laser beam 90 is defined in dx, dy, dvx, dvy, dtx, and dty components that are further processed by a position profiler 100.

Laser controller 96 is controlled by timing data generated by profiling process 98 and further coordinated by a delay L+M 101 that synchronizes the firing of a laser 102 to the motion of laser beam deflection stage 84 and X- and Y-axis translation stages 86 and 88. Delay L+M 101 is described in more detail with reference to FIG. 2.

The dx, dy, dvx, dvy, dtx, and dty components generated by profiling process 98 are further processed by position profiler 100 into a positioning signal required to move X- and Y-axis translation stages 86 and 88 as commanded by the database. Instantaneous values of the positioning signal are generated by DSP 82 at a rate of at least 10,000 points per second.

The resulting positioning signal has acceleration and position components that are received by a low-pass filter 103 having a constant signal propagation delay L and by a delay L element 104 that compensates for the constant signal propagation delay L of low-pass filter 103. Low-pass filter 103 and delay L element 104 also cooperate, as described below, to move positioner stages 86 and 88 and laser beam deflection stage 84 over their position profiles while maintaining their accelerations within specified limits.

The position command received by low-pass filter 103 conveys low-pass filtered position command data through an adder 105 to low-frequency controller 106, which in turn drives X-axis translation stage 86 (shown in both pictorial and block forms). The low-pass filtered position command data are matched to the response bandwidth of X- and Y-axis translation stages 86 and 88, which move and settle more slowly than the higher response bandwidth positioners in laser beam deflection stage 84. Low-pass filter 103 is preferably a fourth-order low-pass filter that is implemented in DSP 82 by cascading two or more second-order filters having critical damping ratios. Because low-pass filter 103 produces filtered position command data having a constant time delay L with respect to the position command, the constant time delay L is compensated for by delay L element 104. Delay L element 104 is preferably implemented in DSP 82 as a programmed delay in conveying the unfiltered positioning commands from position profiler 100 to signal processing elements for driving laser beam deflection stage 84.

X- and Y-axis translation stages 86 and 88 include position sensors 107, one of which conveys to adder 105 an actual position signal of X-axis translation stage 86. Adder 105 subtracts the actual position signal from the low-pass filtered command data to close the control loop and direct X-axis translation stage 86 to the commanded position.

Another adder 108 subtracts the actual position signal from position sensor 107 from the delayed positioning commands produced by delay L element 104 and produces a low-frequency stage position error signal that is conveyed to a mid-pass filter 109 and a delay M element 110. The low-frequency stage error signal received by mid-pass filter 109 conveys mid-pass filtered position error data through an adder 111 to a mid-frequency controller 112, which in turn drives galvonometer-deflected mirror 66 in laser beam deflection stage 84 (shown in both pictorial and block forms). The mid-pass filtered position error data are matched to the response bandwidth of galvonometer deflected mirror 66. Mid-pass filter 109 is preferably a fourth-order low-pass filter that is implemented in DSP 82 by cascading two or more second order filters having critical damping ratios. Because mid-pass filter 109 produces filtered position error data having a constant time delay M with respect to the error signal, the constant time delay M is compensated for by delay M element 110. Delay M element 110 is preferably implemented in DSP 82 as a programmed delay in conveying the error data from adder 108 to the signal processing elements for driving laser beam deflection stage 84.

Galvonometer-deflected mirrors 64 and 66 include position sensors 113, one of which conveys to adder 111 an actual position signal of galvonometer driven mirror 66. Adder 111 subtracts the actual position signal from the mid-pass filtered error data to close the control loop and direct galvonometer driven mirror 66 to the commanded position.

Yet another adder 114 subtracts the actual position signal from position sensor 113 from the delayed error signal produced by delay M element 110 and produces a mid-frequency stage position error signal that is conveyed to through an optional adder 115 (shown in phantom) to a high-frequency controller 116, which in turn drives a high-frequency stage 117 in laser beam deflection stage 84 (shown in both pictorial and block forms). The mid-frequency stage position error signal is matched to the response bandwidth of high-frequency stage 117. High-frequency stage 117 may include optional position sensors 118, one of which conveys to optional adder 115 an actual position signal of high-frequency stage 117. Adder 115 subtracts the actual position signal from the mid-frequency stage error signal to close the control loop and direct high-frequency stage 117 to the commanded position.

Returning to delay L+M 101, skilled workers will now understand that laser 102 should not be fired until laser beam 90 is properly directed to a commanded location on workpiece 92. For this to occur, the positioning command from position profiler 100 must have propagated through delay L element 104 and delay M element 110. Accordingly, delay L+M 101 preferably includes the sum of the delays of delay L element 104 and delay M element 110.

Figure 1:
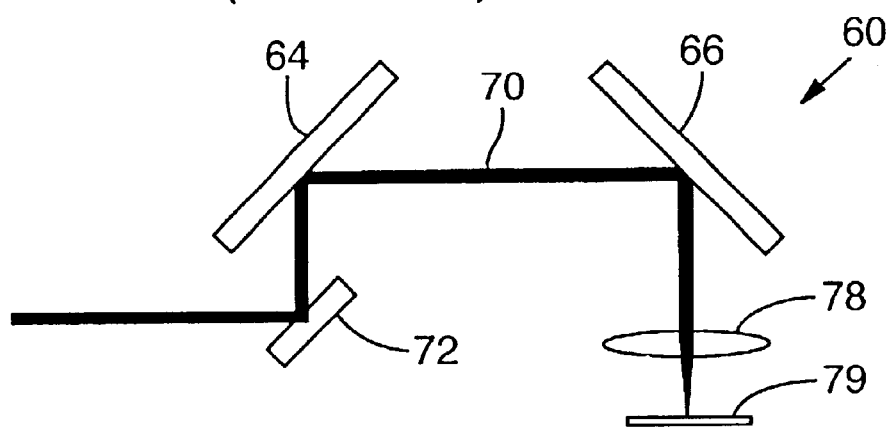
FIG. 1 is a simplified side view of a prior art fast positioner employing a pair of galvanometer-driven mirrors that deflect the laser beam along different respective single axes.
Figure 3:
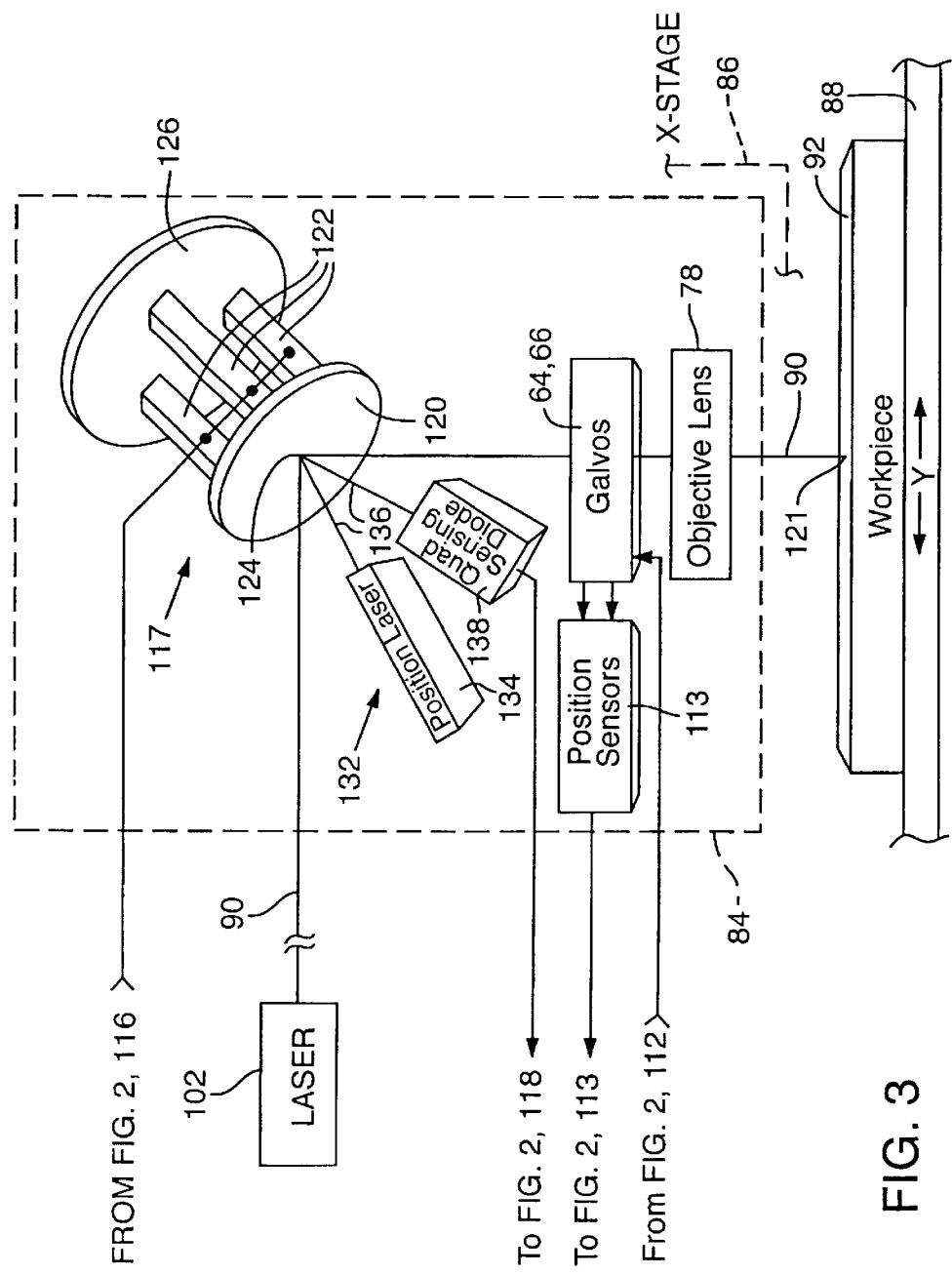
FIG. 3 is a combined pictorial and electrical block diagram of a laser beam deflection stage employed in the tertiary laser beam positioning system of FIG. 2.

FIG. 3 shows a preferred embodiment of laser beam deflection stage 84. Referring also to FIGS. 1 and 2, galvanometer-driven X- and Y-axis mirrors 64 and 66 receive drive signals from mid-frequency controller 112. This invention substantially reduces the effects of low- and mid-frequency stage settling times by adding high-frequency stage 117 within laser beam deflection stage 84. In the preferred embodiment, which is directed to ECB via drilling, circuit element trimming, and micro-machining applications, high-frequency stage 117 includes an FSM 120 that is positioned to receive laser beam 90, deflect it through galvanometer-driven X- and Y-axis mirrors 64 and 66, through objective lens 78 to a target location 121 on workpiece 92.

FSM 120 is deflected by electrostrictive actuators having a higher frequency response than galvanometer-driven X- and Y-axis mirrors 64 and 66. FSM 120 is preferably deflected by lead magnesium niobate ("PMN") actuators 122 that translate voltage into displacement. PMN material is similar to the more common piezoelectric actuator material but has less than one percent hysteresis. The preferred PMN actuators 122 have a limited displacement of about 5 microns for a 10 millimeter ("mm") long hollow cylinder of PMN material, but have a very high stiffness of about 210 Newtons per micron for a 5 mm diameter cylinder. The preferred embodiment is a single hollow cylinder of PMN material that is electrically divided into three active regions. Activating a region causes an associated side to expand, thereby tipping or tilting FSM 120 through an angular range of about ±1 milliRadian ("mRad").

Alternatively, FSM 120 may be coupled through a flexure to three separate PMN actuators 122 having first ends arranged as an equilateral triangle having its center aligned with a center 124 of FSM 120. The second ends of PMN actuators 122 are mechanically coupled to a mount 126 that attaches to X-axis translation stage 86. The three PMN actuators 122 are preferably implemented in a 3-degree of freedom configuration that is used in a 2-degree of freedom mode to tilt and tip FSM 120. In particular, the actuator triangle has 5 mm sides such that FSM 120 can be deflected at about a ±4 mRad angle, which translates into a ±640 micron deflection of laser beam 90 when projected onto workpiece 92 with an 80 mm objective lens 78.

High-frequency stage 117 operates at higher frequencies and accelerations than galvanometer-driven X- and Y-axis mirrors 64 and 66. In particular, PMN actuators 122 have about a 2.0 microFarad characteristic capacitance, 1.0 ohm DC impedance, 17 ohms impedance at 5 kiloHertz ("kHz"), and draws over three amperes of current at 75 volts of drive. The PMN actuator driving FSM 120 has a large-signal bandwidth greater than about 5 kHz, a small-signal bandwidth greater than about 8 kHz, and a deflection angle of at least about ±1 mRad for deflecting laser beam 90 with about ±0.5 micron positioning accuracy.

With reference to the above-described high-frequency stage performance, the positional error signal developed by adder 114 is conveyed to optional adder 115, the output of which is conveyed to high-frequency controller 116 for driving PMN actuators 122. An optional FSM position sensor 132 provides to optional adder 115 an FSM actual position signal for correcting any residual FSM 120 positioning error. Optional FSM position sensor 132 includes a position laser 134 that generates a laser beam 136 that reflects off FSM 120 and onto a position-sensing detector 138, such as a quad-sensing diode array. As FSM 120 is deflected, laser beam 136 is deflected away from the center of position-sensing detector 138 as a function of the deflection angle. Position-sensing detector 138 responds by providing a signal or signals indicative of the FSM 120 deflection angle. Alternative FSM position sensor embodiments are possible including capacitive- and strain gage-based position sensors.

Tertiary positioner system 80 employing high-frequency stage 117 increases electronic circuit processing throughput by decreasing the time required to move between target locations 118 and by decreasing the processing time at each location. It also enables new processes that were not previously possible. Adding high-frequency stage 117 as a third positioning stage provides more accurate positioning because positional and settling time errors caused by the low- and midfrequency stages can be corrected.

Set forth below are examples of some additional beneficial applications for tertiary positioner system 80.

Artificial Spot Enlarging: Position profiler 100 commands tertiary positioner system 80 to follow a predetermined tool path while also moving the position of laser beam 90 in small circles or oscillations. This beam movement distributes the energy of laser beam 90 over a larger area and effectively makes a wider cut along the tool path. This beam movement also spreads the laser energy over a larger area, which can help control the process window and, thereby, reduce the need for an imaged spot.

Beam Settling: FSM 120 corrects for residual positioning errors including galvanometer errors, which allows galvanometer-driven X- and Y-axis mirrors 64 and 66 to be tuned more aggressively, further reducing target-to-target move times. This also improves positioning accuracy because the system corrects for galvanometer inaccuracy, "creep" and tolerance changes. Galvanometer-driven X and Y-axis mirrors 64 and 66 with ±5–10 micron high-speed accuracy can be substantially corrected by FSM 120.

ECB Via Drilling: As the power of laser 102 is increased, a corresponding speed increase is required for trepaning and spiral drilling. Galvanometers are limited by their operating bandwidth, which is typically about 1–1.5 kHz. Because FSM 120 has at least a 5 kHz operating bandwidth, and a range of motion at least as large as the hole diameter being drilled, fast trepaning and spiral drilling positioning commands can be directed through position profiler 100 while the commanded beam position is kept constant.

Small Angle Positioning: The movement range of a positioner stage is often referred to as its "working envelope." If FSM 120 has a sufficiently large working envelope to position laser beam 90 at a new target location ahead of the current position of galvo stages 64 and 66, processing of the next target location can begin before galvo stages 64 and 66 are fully repositioned. Galvo stages 64 and 66 move into their final position as the new target location is being processed. As galvo stages 64 and 66 move into their final position, FSM 120 moves back to its centered position.

Figure 4B:
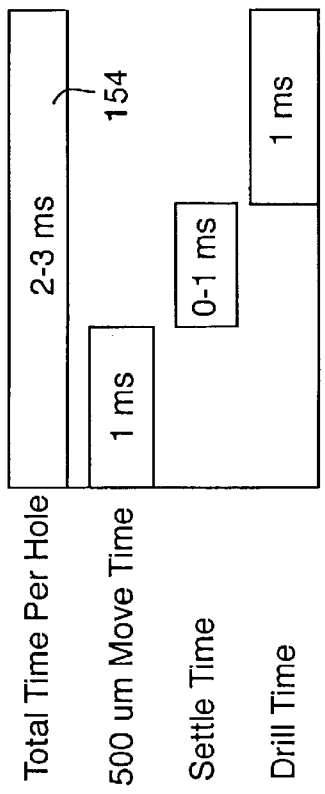
FIG. 4B is a bar graph showing the moving, settling, hole drilling, and total hole processing times required by the prior art positioner of FIG. 4A.
Figure 4A:
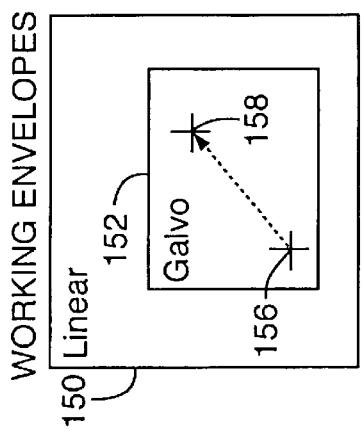
FIG. 4A is simplified pictorial representation of a working envelope for a prior art positioner employing linear and galvanometer stages.

To understand the throughput advantage of tertiary positioner system 80, FIG. 4A represents the performance of a prior art positioner having a linear stage working envelope 150 and a galvanometer stage working envelope 152. FIG. 4B shows a total processing time 154 required to move 500 microns from a current target location 156 to a new target location 158 and drill a hole at new target location 158. This prior art example assumes that the galvanometer stage executes a 500 micron move in 1.0 millisecond ("ms"), has a zero to one ms settling time, and a hole drilling time of 1.0 ms. Therefore total move and hole processing time 154 is 2.0 ms to 3.0 ms.

Figure 5B:
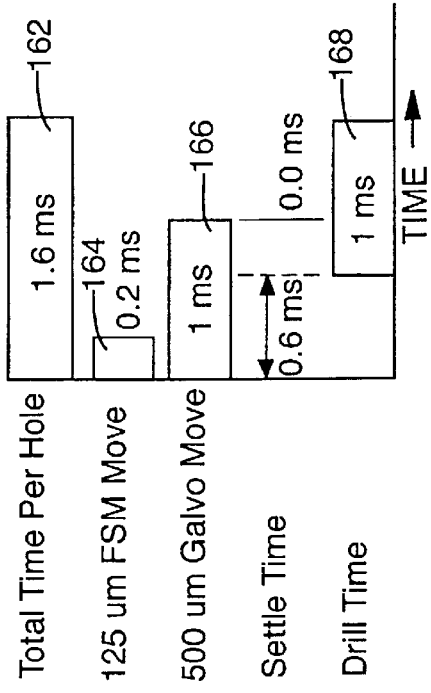
FIG. 5B is a bar graph showing the galvo moving, FSM moving, settling, hole drilling, and total hole processing times required by the tertiary positioner of FIG. 5A.
Figure 5A:
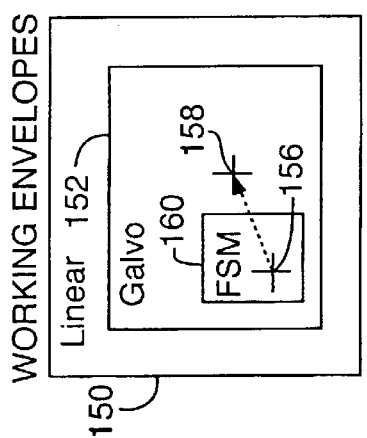
FIG. 5A is simplified pictorial representation of a working envelope for a tertiary positioner of this invention employing linear, galvanometer, and FSM stages.

In contrast, FIG. 5A represents the performance of a tertiary positioner of this invention having linear stage working envelope 150, galvanometer stage working envelope 152, and an FSM working envelope 160. FIG. 5B shows a total processing time 162 required to move 500 microns from current target location 156 to new target location 158 and drill a hole at new target location 158. This example also assumes that the galvanometer stage executes a 500 micron move in 1.0 ms, has a 0.0 ms to 1.0 ms settling time, and a hole drilling time of 1.0 ms. In this example, the FSM has a ±125 micron working envelope and the total processing time 162 includes the following components as shown in FIG. 5B. A 125 micron FSM move 164 starts concurrently with a 500 micron galvo move 166. FSM move 164 reaches the extent of FSM working window 160 in 0.2 ms while galvo move 166 continues. FSM move 164 plus galvo move 166 causes new target location 158 to be reached in 0.6 ms, at which time a 1.0 ms drilling time 168 begins while galvo move 166 completes and settles and the FSM corrects for the positioning errors generated by the completion and settling of galvo move 166. Therefore total move and hole processing time 162 is 1.6 ms, which represents a 16 percent throughput improvement over the prior art positioner system. The improvement is 47% if the settling time is 1.0 ms.

Large Angle Positioning: If the FSM in the above-described example had a ±500 micron working envelope, the total move time between 500 micron spaced holes would be reduced by a factor of 5, and the throughput would be increased by 40 percent.

Figure 6:
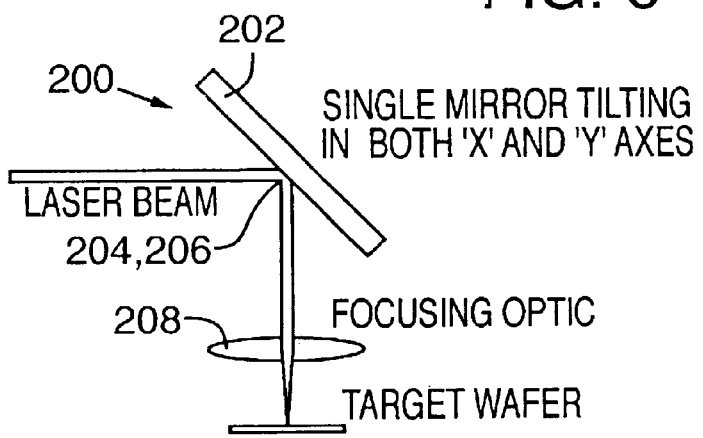
FIG. 6 schematically illustrates a side sectional view of a two-axis FSM application of this invention.

FIG. 6 show a typical two-axis steering mirror system 200. Various technologies may be employed to tilt a mirror 202 in two axes about a pivot point 204. These technologies include FSMs that employ a flexure mechanism and voice coil actuators, piezoelectric actuators that rely upon deformation of piezoelectric, electrostrictive, or PMN actuators materials, and piezoelectric or electrostrictive actuators to deform the surface of a mirror. Suitable voice coil actuated FSMs are available from Ball Aerospace Corporation of Broomfield, Colo. and Newport Corporation of Irvine, Calif. A suitable piezoelectric actuator is a model S-330 Ultra-Fast Piezo Tip/Tilt Platform manufactured by Physik Instrument ("PI") GmbH & Co. of Karlsruhe, Germany.

Galvanometer deflected mirrors are typically not used in applications, such as semiconductor wafer processing because they each only tilt a mirror about one axis. Moreover, a pair of physically separated galvanometer mirrors are required for two axes of actuation. This separation is incompatible with the desire that actuation occur about one pivot point located near an entrance pupil 206 of a focusing lens 208 to maintain a high quality laser spot at the surface of a semiconductor wafer. Nevertheless, it is possible to employ galvanometer deflected mirrors in such applications, particularly if employed ahead of mirror 202 and in single-axis and small deflection configurations to maintain accuracy and well focused laser spots. If small deflections are employed, two small galvanometer-deflected mirrors could be employed operating at higher than typical bandwidths.

Of course, other vendors or other types of mirror or actuator designs are suitable for use with this invention.

In addition to all the other above-described advantages, this invention permits a relaxation on the requirements for the linear motors and galvanometer-driven mirrors (jerk time, settling time) using the secondary or tertiary system to correct for errors. This can substantially reduce the cost of the linear and galvanometer positioners and also reduces the dependency of the system throughput on the acceleration limit of the linear and galvanometer stages.

Skilled workers will appreciate that the FSM systems of this invention can be adapted for use in etched-circuit board via drilling, micro-machining, and laser trimming applications.

Skilled workers will recognize that portions of this invention may be implemented differently from the implementations described above for preferred embodiments. For example, the invention is not limited to low-, mid-, and high frequency stage embodiments, but may include additional stages, such as a very-high-frequency positioner stage that is responsive to a very-high-frequency portion of the position command. Also, the DSP may be implemented in whole or in part with discrete components, some of which being analog components. For example, the adders may be implemented as analog summing junctions, but are preferably implemented as coded programs.

It will be obvious to those having skill in the art that many changes may be made to the details of the above-described embodiments of this invention without departing from the underlying principles thereof. Accordingly, it will be appreciated that this invention is also applicable to laser beam aiming applications other than those found in electronic component processing. The scope of this invention should, therefore, be determined only by the following claims.

We claim:

1. An apparatus for directing a laser beam toward a target location on a workpiece in response to a position command, comprising:
   a low-bandwidth positioner stage directing at least one of the workpiece and the laser beam relative to one another in response to a low-frequency portion of the position command;
   a mid-bandwidth positioner stage directing at least one of the workpiece and the laser beam relative to one another in response to a mid-frequency portion of the position command; and
   a high-bandwidth positioner stage directing at least one of the workpiece and the laser beam relative to one another in response to a high-frequency portion of the position command.

2. The apparatus of claim 1, in which the high-bandwidth positioner stage includes a fast steering mirror.

3. The apparatus of claim 2, in which the fast steering mirror is positioned in response to differences between the target location defined by the position command and actual positions of at least the low- and mid-bandwidth positioner stages.

4. The apparatus of claim 2, further including a sensor for measuring an actual position of the low-bandwidth positioner stage and in which the fast steering mirror is positioned in response to a difference between the actual position of the low-bandwidth positioner stage and the target location defined by the position command.

5. The apparatus of claim 1, in which the mid-bandwidth positioner stage includes at least one galvanometer-driven mirror and a sensor for measuring an actual position of the mid-bandwidth positioner stage.

6. The apparatus of claim 5, in which the fast steering mirror is positioned in response to a difference between the actual position of the mid-bandwidth positioner stage and the target location defined by the position command.

7. The apparatus of claim 1, further including a very-high-frequency positioner stage directing at least one of the workpiece and the laser beam relative to one another in response to a very-high-frequency portion of the position command.

8. The apparatus of claim 1, in which the low-bandwidth positioner stage includes linear stages that are arranged in a stacked configuration, a split-axis configuration, or a planar configuration.

9. The apparatus of claim 1, in which the high-bandwidth positioner stage includes a fast steering mirror that deflects the laser beam along two axes.

10. The apparatus of claim 9, in which the fast steering mirror is positioned by at least one of a voice coil actuator, a piezoelectric actuator, an electrostrictive actuator, or a lead magnesium niobate actuator.

11. The apparatus of claim 9, in which the fast steering mirror further includes a position sensor for determining an actual position of the fast steering mirror and in which the fast steering mirror is positioned in response to a difference between the actual position of the fast steering mirror and the target location defined by the position command.

12. The apparatus of claim 1, further including a low-pass filter and a mid-pass filter that receive the position command and, respectively, pass the low-frequency and mid-frequency portions of the position command.

13. The apparatus of claim 12, in which the low-pass and mid-pass filters have associated first and second filter delays and the apparatus further includes first and second delay elements that compensate for the first and second filter delays.

14. A method for directing a laser beam for processing a target location on a workpiece in response to a position command, comprising:

directing at least one of the workpiece and the laser beam relative to one another in response to a low-frequency portion of the position command;

directing at least one of the workpiece and the laser beam relative to one another in response to a mid-frequency portion of the position command; and directing at least one of the workpiece and the laser beam relative to one another in response to a high-frequency portion of the position command.

15. The method of claim 14, in which the processing includes at least one of drilling, micro machining, dithering, spiral drilling, trepan drilling, and correcting a roundness of a hole.

16. The method of claim 14, in which the workpiece includes an electronic circuit and the processing includes tuning a circuit element on the electronic circuit.

17. The method of claim 14, in which the workpiece includes an electronic circuit substrate and the processing includes making a hole in the electronic circuit substrate.

* * * * *